United States Patent
Lee et al.

(10) Patent No.: US 6,937,315 B2
(45) Date of Patent: Aug. 30, 2005

(54) LIQUID CRYSTAL PANEL WITH ISOLATION WALL STRUCTURE AND ITS PRODUCING METHOD

(75) Inventors: Yu-Chi Lee, Taipei (TW); Po-Hsiu Shih, Taipei Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 108 days.

(21) Appl. No.: 10/426,626

(22) Filed: May 1, 2003

(65) Prior Publication Data

US 2004/0218135 A1 Nov. 4, 2004

(51) Int. Cl.⁷ .................................... G02F 1/1339
(52) U.S. Cl. .................. 349/153; 349/187; 349/190
(58) Field of Search ............... 349/153, 187, 349/189, 190

(56) References Cited

U.S. PATENT DOCUMENTS

| | | | | |
|---|---|---|---|---|
| 5,511,591 A | * | 4/1996 | Abe | 141/7 |
| 5,795,629 A | * | 8/1998 | Harada et al. | 428/1.23 |
| 5,817,743 A | * | 10/1998 | Gibbons et al. | 528/353 |
| 5,854,664 A | * | 12/1998 | Inoue et al. | 349/92 |
| 6,055,035 A | * | 4/2000 | von Gutfeld et al. | 349/187 |
| 6,219,126 B1 | | 4/2001 | Von Gutfeld | |
| 6,222,603 B1 | * | 4/2001 | Sakai et al. | 349/153 |
| 6,304,311 B1 | * | 10/2001 | Egami et al. | 349/189 |
| 6,331,881 B1 | * | 12/2001 | Hatano et al. | 349/86 |
| 6,628,365 B1 | * | 9/2003 | Park et al. | 349/153 |
| 6,650,392 B2 | * | 11/2003 | Iwanaga et al. | 349/153 |
| 6,734,942 B2 | * | 5/2004 | Takeuchi | 349/153 |
| 6,771,347 B2 | * | 8/2004 | Hirakata | 349/151 |
| 6,791,660 B1 | * | 9/2004 | Hayashi et al. | 349/190 |
| 6,795,153 B2 | * | 9/2004 | Suzuki | 349/153 |
| 2004/0263763 A1 | * | 12/2004 | Kojima | 349/153 |

* cited by examiner

*Primary Examiner*—Kenneth Parker
(74) *Attorney, Agent, or Firm*—Birch, Stewart, Kolasch & Birch, LLP

(57) ABSTRACT

The present invention provides a liquid crystal panel with an isolation wall structure and its producing method. The method comprise: selecting one substrate from two substrates that have been put under alignment process and forming on it a plurality of closing isolation wall structure that is mutual-repulsive to liquid crystal; then forming a close sealant on the substrate, the sealant being located between outer edge of the substrate and the isolation wall structure; and then, combining the two substrates for confining liquid crystal in the isolation wall structure and isolating the liquid crystal from the sealant.

16 Claims, 3 Drawing Sheets

LIQUID CRYSTAL PANEL WITH ISOLATION WALL STRUCTURE AND ITS PRODUCING METHOD

BACKGROUND OF THE INVENTION

1. Field of the Present Invention

The present invention relates to a process of producing liquid crystal panel containing liquid crystal dropping process, and more particularly, to a liquid crystal dropping process in which an isolation wall structure that is mutual-repulsive to liquid crystal is added and its producing method.

2. Description of Prior Art

Liquid crystal material is fluid, therefore it needs only very small external strength to move liquid crystal molecule and arrange in different ways. Take Nematic type liquid crystal for example, which is quite common, electric field can be used to change direction of liquid crystal molecule, and since the optic axis and the molecule axis of liquid crystal are in accord, thus causing optic effects. And if the arranging direction of liquid crystal is aligned properly in the beginning, then when the electric field imposed on liquid crystal is removed, on account of its own elasticity and viscosity, liquid crystal molecule will quickly go back to its original condition before the electric field is imposed on.

In prior injection of liquid crystal, vacuum liquid crystal injection process is usually used. Wherein, a LCD panel that has been cut and constituted is put into a vacuum sealant-up case, the LCD panel is then fixed up by a substrate, and liquid crystal is provided by a liquid crystal container under the substrate. Since the space in seal-up case is vacuum, liquid crystal can be drawn into LCD panel by capillarity and thus completes liquid crystal injection.

But this vacuum liquid crystal injection process takes very much time. Take a 15-inch LCD panel with a cell gap of 4.0 um for example: the vacuum liquid crystal injection process takes nearly 40 hours. And the liquid crystal injection process takes longer time as the size of LCD panel grows larger and as the cell gap shortens, thus causes a bottleneck in the process.

In order to eliminate this bottleneck in the process, a faster liquid crystal injection process has been developed, which is called One-Drop Filling technique. Wherein, a Uitra-Violet Rays sealant (abbr. UV sealant) is coated on a large-size substrate that has not been cut to form a plurality of close area that are similar to rectangles. Then liquid crystal is dropped directly on the substrate in controllable quantity by a dropping device, and the liquid crystal dropped in is confined in close areas formed by the UV sealant to prevent from overflowing. The substrate is then put in vacuum to be assembled with another substrate. After the assembly, the procedures of compression of sealant and curing of UV light irradiation are processed. The cell process is completed with cutting and sealing the cell. If a 15-inch LCD panel with a cell gap of 4.0 um is put under this ODF process, the time that the process takes about 1.5 hour shorter than before. And ODF process has nothing to do with the length of cell gap of LCD panel. Therefore, ODF technique has advantages such as simplification of the process, shorter time for the process, alienation of the process (that is to say, having nothing to do with the length of cell gap), less overflowing and wasting of liquid crystal, and fewer bubbles caused by incomplete liquid crystal injection, etc.

As is shown in FIG. 1 (excerpted from 1350-SID 01 DIGEST 56.2/S. Yamada), although ODF technique has the advantages said above, yet before liquid crystal 4 is dropped on substrate 1a or 1b, highly sticky sealant 3 must be coated on substrate 1a or 1b for sealing liquid crystal 4 and as adhesive in the assembly of LCD panel; and, at the same time, after the assembly of LCD panel, sealant 3 has to be put under irradiance of UV rays 60 for total curing. Therefore, when liquid crystal 4 is dropped on substrate 1a or 1b with ODF technique, liquid crystal 4 will contact with uncured sealant 3 and therefore makes Epoxy Resin molecule in sealant 3 spread into liquid crystal 4, contaminating and damaging liquid crystal 4. Especially in UV rays 60 irradiating and curing process, UV rays 60 will also irradiate some liquid crystal 4 that has contact with sealant 3 and thus causes more serious contamination of liquid crystal 4. This flaw will cause flaw of alignment of liquid crystal 4, worsening image quality of LCD panel, and also cause degradation of voltage retention of liquid crystal, causing flickers of image.

In order to prevent from contamination of liquid crystal 4 caused by adhesive fillet formed by uncured Epoxy Resin material in producing process of LCD panel, or contamination of spread of sealant molecule into liquid crystal, International Business Machine (IBM) has developed a technique using Barrier Fillet 2, as is shown in FIG. 2. Wherein, a barrier fillet 2 is deployed between adhesive fillet 2ab and liquid crystal 4 for isolating liquid crystal 4 from uncured sealant material 2ab to prevent liquid crystal 4 from being contaminated by uncured Epoxy Resin, referring [Panel Assembly for Liquid Crystal Displays Having Barrier Fillet and an Adhesive Fillet in the Periphery] in U.S. Pat. No. 006,219,126. The barrier fillet 2 described in the patent of IBM is made of compressive material, such as cured silicon elastomer. However, there will be new material cost and new procedures in this process, and in the UV rays irradiating and curing sealant process, liquid crystal cannot be shaded from UV rays and will still be irradiated directly and therefore causes defect in alignment of liquid crystal.

SUMMARY OF THE INVENTION

In order to prevent liquid crystal from being contaminated by uncured sealant in the producing process of LCD panel and to fully exert the advantages of ODF technique such as simplification of the process, shorter time for the process, alienation of the process, less overflowing of liquid crystal, and fewer bubbles caused by incomplete liquid crystal injection, the present invention provides an isolation wall structure added between liquid crystal and sealant in LCD panel, preventing liquid crystal from contacting uncured sealant by using special quality of material of the isolation wall and its producing method and preventing liquid crystal from being directly irradiated by UV rays by using deployment of isolation wall structure. Therefore one major purpose of the present invention is to provide an isolation wall structure that is mutual-repulsive to liquid crystal and its producing method; wherein the isolation wall is deployed between liquid crystal and sealant in LCD panel to prevent liquid crystal from contacting and being contaminated by sealant.

Another major purpose of the present invention is to provide a producing method of thermo-curing glue using the deployment of this isolation wall structure, wherein thermal process is used to cure sealant. This thermal process can increase the yield and also eliminate the effects on liquid crystal caused by UV rays curing irradiance.

And still another major purpose of the present invention is to use the structure of this isolation wall, co-operating with the layout of the mask, to shelter liquid crystal from UV rays and eliminate the effects on liquid crystal caused by the sealant-curing irradiance of UV rays.

According to the major purposes described above, the present invention provides a liquid crystal panel with an isolation wall structure, comprising: two substrates, being put in an assembly in a distance, the inner sides of the two substrates having been put under alignment process; a closing isolation wall structure, located between inner sides of the two substrates; a closing sealant, located between inner sides of the two substrates and between outer edges of the two substrates and the isolation wall structure; and a liquid crystal material, located between the innermost isolation wall structures, the liquid crystal and isolation wall being mutual-repulsive.

The present invention further provides a producing method of liquid crystal panel with an isolation wall structure, comprising: providing two substrates that have been put under alignment and cleaning process; selecting one of the substrates and coating a layer of photo resist on the substrate; processing exposing and development process and forming on the substrate a plurality of closing isolation wall structure; and then curing the isolation wall structure. Then, coating sealant on a substrate, wherein sealant being located between outer edge of the substrate and the cured isolation wall structure. Processing One-Drop Filling process, wherein set quantity of liquid crystal being dropped directly in the isolation wall structure; then moving the two substrates to a vacuum chamber for combination and compression to stick together the two substrates with sealant to form a liquid crystal display panel; finally, irradiating sealant with UV rays for curing the sealant.

The present invention further provides another producing method of liquid crystal panel with an isolation wall structure, comprising: providing two substrates that have been put under alignment and cleaning process; selecting one of the substrates and coating a layer of photoresist on the substrate; processing exposing and development process and forming on the substrate a plurality of closing isolation wall structure; and then curing the isolation wall structure. Then, coating thermo-curing glue on a substrate, wherein thermo-curing glue being located between outer edge of the substrate and the cured isolation wall structure. Processing One-Drop Filling process, wherein set quantity of liquid crystal being dropped directly in the isolation wall structure; then moving the two substrates to a vacuum chamber for combination and compression to stick together the two substrates with thermo-curing glue to form a liquid crystal display panel; finally, putting the liquid crystal panel in an oven for roasting (i.e. without UV curing) to thermally cure the thermo-curing glue.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DESCRIPTION OF THE PREFERRED EMBODIMENT

Figure 1:
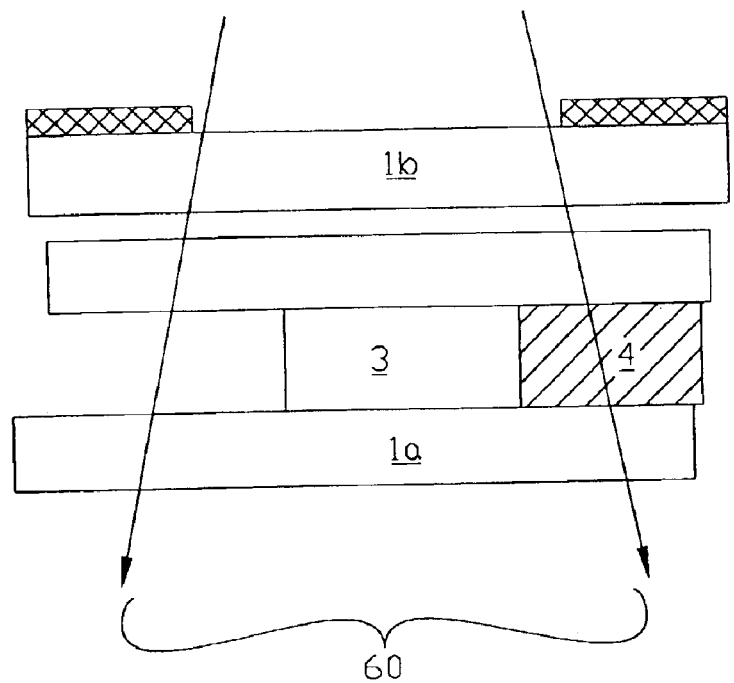
FIG. 1 is a diagram of prior art in which UV rays are used to irradiate sealant for curing it.
Figure 2:
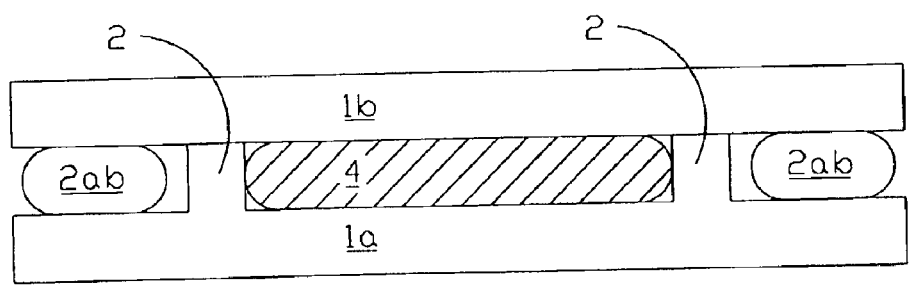
FIG. 2 is a diagram of prior art.

In the following is detailed description of preferred embodiments of the present invention, complete producing process is not included in the description of producing process and structure of LCD panel of which. The description of prior technique applied in the present invention is only quoted in summary to support the description of the present invention. And relating drawings in the following text are not made in factual proportion since their function is only to illustrate the characteristics of structure of the present invention.

The present invention provides a liquid crystal panel with isolation wall structure, comprising: two substrates, being put in an assembly in a distance, the inner sides of the two substrates having been put under alignment process; a closing isolation wall structure, located between inner sides of the two substrates; a closing sealant, located between inner sides of the two substrates and between outer edges of the two substrates and the isolation wall structure; a liquid crystal material, located between the innermost isolation wall structures, the liquid crystal and isolation wall being mutual-repulsive.

The present invention further provides a producing method of liquid crystal panel with an isolation wall structure, comprising: providing two substrates that have been put under alignment and cleaning process; selecting one of the substrates and coating a layer of photo resist on the substrate; processing exposing and development process and forming closing isolation wall structure on the substrate; and then curing the isolation wall structure. Then, coating sealant on a substrate, wherein sealant being located between outer edge of the substrate and the cured isolation wall structure. Processing One-Drop Filling process, wherein set quantity of liquid crystal being dropped directly in the isolation wall structure; then moving the two substrates to a vacuum chamber for combination and compression to stick together the two substrates with sealant to form a liquid crystal display panel; finally, irradiating sealant with UV rays for curing the sealant.

The present invention further provides another producing method of liquid crystal panel with an isolation wall structure, comprising: providing two substrates that have been put under alignment and cleaning process; selecting one of the substrates and coating a layer of photoresist on the substrate; processing exposing and development process and forming closing isolation wall structure on the substrate; and then curing the isolation wall structure. Then, coating thermo-curing glue on a substrate, wherein thermo-curing glue being located between outer edge of the substrate and the cured isolation wall structure. Processing One-Drop Filling process, wherein set quantity of liquid crystal being dropped directly in the isolation wall structure; then moving the two substrates to a vacuum chamber for combination and compression to stick together the two substrates with thermo-curing glue to form a liquid crystal display panel; finally, putting the liquid crystal panel in an oven for roasting to cure the thermo-curing glue.

The embodiment and the preferred embodiments of the present invention are then described in detail in the following illustrated by FIG. 3 to FIG. 6.

Figure 3:
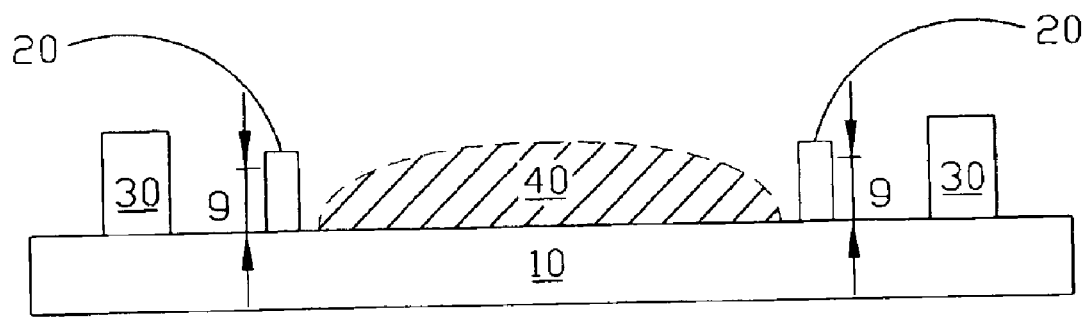
FIG. 3 is a cross-section view of the present invention.

FIG. 3 is a cross-section view of the structure of the present invention. First, forming a close rectangular isolation wall 20 that is mutual-repulsive to liquid crystal 40 on one of the two substrates that have been put under Thin Film Transistor, Color Filter, and alignment process, for example, substrate 10. Wherein, the mutual-repulsion between isolation wall 20 and liquid crystal 40 has to match what is demanded in FIG. 4: the contact angle θ of liquid crystal 40 with material of isolation wall 20 being larger than 10 degrees for ensuring the mutual-repulsion between isolation wall 20 and liquid crystal 40.

Figure 4:
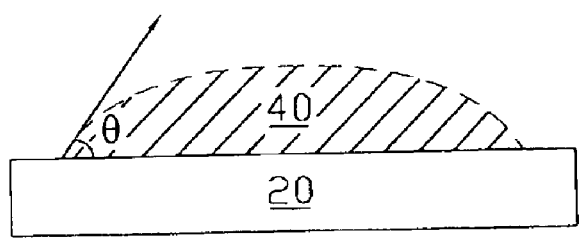
FIG. 4 is a diagram for defining contact angle of liquid crystal in the present invention.

In the measuring method in FIG. 4, a specific material, such as PMMA is coated on a dummy wafer, after baking and curing, the liquid crystal material that is to put under test is dropped on PMMA (Poly (methyl methacrylate)) material. Then a measuring instrument is used for measuring, the result must match with the specification that the contact angle θ of liquid crystal 40 under test with PMMA material is larger than 10 degrees. The specification is set to prevent liquid crystal 40 from climbing along and over isolation wall 20 because of tension when it is dropped in normal condition and thus causes smaller quantity of liquid crystal 40 and incomplete filling. Besides, in the dropping process of liquid crystal 40, even if there is aberration of dropping location that prevents liquid crystal 40 from being dropped on the central part of isolation wall 20, this mutual-repulsive property can also help to keep liquid crystal 40 on a proper location.

Then, referring FIG. 3, in the dropping process of liquid crystal, the width of isolation wall 20 must be longer than 5 um for preventing liquid crystal 40 from climbing and flowing over isolation wall 20 when the quantity of liquid crystal 40 that is dropped is larger than the limit set in the specification. And the distance in the isolation wall structure formed by a plurality of isolation walls 20 can be deployed differently according to the demand of product and producing equipment. Furthermore, the height of isolation wall 20 should be longer than cell gap g of LCD panel 100 to sealant liquid crystal 40 in the area of isolation wall 20 when the two substrates 10 and 11 on which TFT and Color Filter are located are put under assembling process.

Then, forming a close rectangular sealant 30 between outer edge of substrate 10 and isolation wall 20, the sealant 30 surrounding isolation wall 20 and the preferred distance between the two being 5 mm. This distance can function as space needed for forming a plurality of isolation wall structures, and can also function as extensive space of isolation wall 20 and material of sealant 30 when LCD panel 100 is put under assembling and compression process. Further, the distance can also function as a buffer for shielding UV rays when UV rays irradiate the sealant in curing process.

Figure 5:
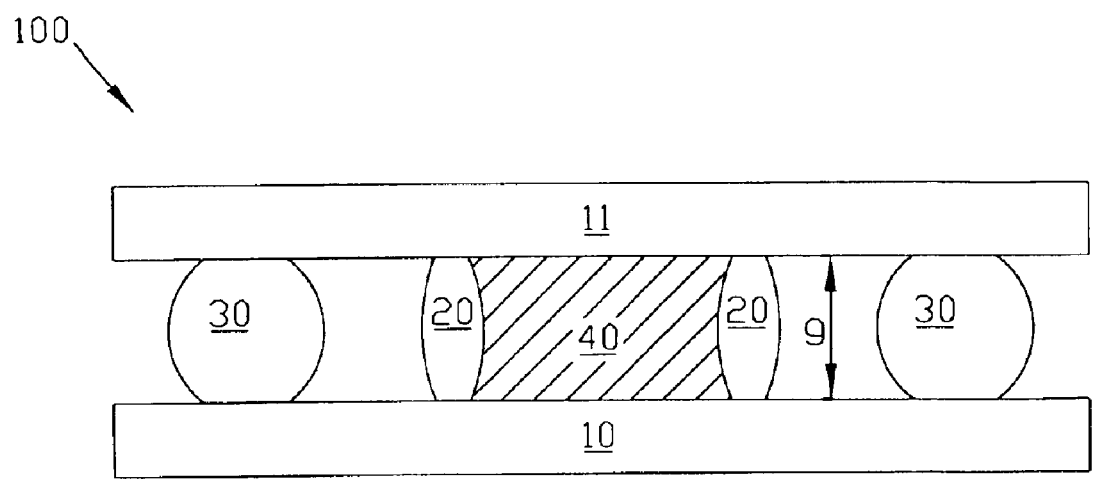
FIG. 5 is a diagram of complete structure of producing process of LCD panel of the present invention.
Figure 6:
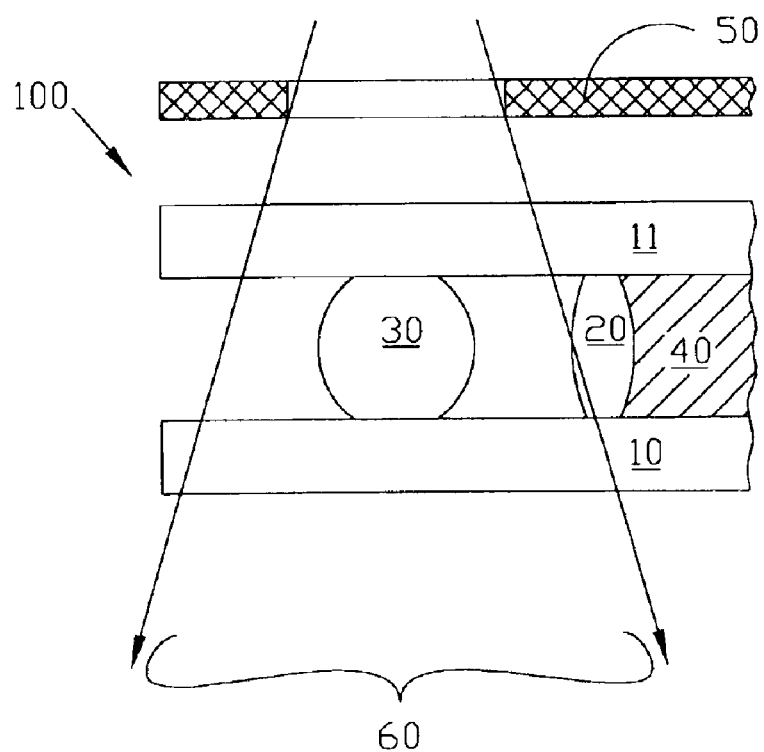
FIG. 6 is a diagram of irradiating process of UV rays of the present invention.

FIG. 5 is a cross-section view of LCD panel 100 with structure of isolation wall 20 that has already been put in assembly, the producing process of which is described as follows:

First, two substrates 10 and 11 that have been put under alignment process are provided, after cleaning, one of the two substrates, substrate 10 for example, is selected and a layer of photoresist that has the property of PMMA is coated on the substrate. After exposing and development process, a close isolation wall 20 is formed on substrate 10, and the substrate 10 is then put in an oven for post curing to cure photoresist that has the property of PMMA. After the photoresist having the property of PMMA has been cured, it becomes mutual-repulsive to liquid crystal 40. Then, sealant is coated on substrate 10, wherein a nozzle is used to form a close sealant 30 according to set shape and location on outer edge of substrate 10 with highly adhesive PMMA, Epoxy Resin for example. The sealant 30 must be located between outer edge of substrate 10 and cured isolation wall 20, wherein the distance between uncured PMMA sealant 30 and cured isolation wall 20 is preferred to be kept as 5 mm. ODF process is then processed, wherein set quantity of liquid crystal is directly dropped in isolation wall 20 through a nozzle; the two substrates are then moved to a vacuum chamber to go through assembly and compressing process, wherein substrate 10 and 11 are aligned and adhered to each other with sealant to form LCD panel 100; then, LCD panel 100 is moved out of the vacuum chamber for curing process of sealant 30 by using UV rays 60 to cure sealant 30. Since there has been preserved enough distance between sealant 30 and isolation wall 20, UV rays 60 will not irradiate liquid crystal 40 while going through mask 50 for curing irradiation, and thus the quality of liquid crystal 40 can be guarantied. Referring to FIG. 6.

In the process of coating sealant 30, sealant 30 can also be coated on substrate 11, but the relative location should be the same as the location on substrate 10 on which sealant 30 is coated. Besides, isolation wall 20 can also be formed on substrate 11, and then LCD panel 100 is formed according to the steps described above.

In the following is the description of producing method of the first preferred embodiment of the present invention:

As is shown in FIG. 5, first, two substrates 10 and 11 that have been put under alignment process are provided, after cleaning, one of the two substrates, substrate 10 for example, is selected and a layer of photoresist that has the property of PMMA is coated on the substrate. After exposing and development process, a plurality of close isolation walls 20 of same shape is formed on substrate 10, the width of each isolation wall being 5 um and distance between each isolation wall 20 can be properly designed according to the wave length of UV rays 60 that irradiate. Generally speaking, the distance ranges from 5 to 50 um. Then, the substrate 10 is then put in an oven for post curing to cure the photoresist. Then, sealant is coated on substrate 10, wherein a nozzle is used to form a close sealant 30 according to set shape and location on outer edge of substrate 10 with highly adhesive PMMA, Epoxy Resin for example. The sealant 30 must be located between outer edge of substrate 10 and cured isolation wall 20, wherein the distance between uncured PMMA sealant 30 and cured isolation wall 20 is preferred to be kept as 5 mm. ODF process is then processed, wherein set quantity of liquid crystal is directly dropped in the innermost isolation wall through a nozzle; the two substrates are then moved to a vacuum chamber to go through assembly and compressing process, wherein substrate 10 and 11 are aligned and adhered to each other with sealant to form LCD panel 100; then, LCD panel 100 is moved out of the vacuum chamber for curing process of sealant 30 by using UV rays 60 to cure sealant 30.

In the process of coating sealant 30, sealant 30 can also be coated on substrate 11, but the relative location should be the same as the location on substrate 10 on which sealant 30 is coated. Besides, isolation wall 20 can also be formed on substrate 11, and then LCD panel 100 is formed according to the steps described above.

The second preferred embodiment of the present invention is then provided. Referring to the structure shown in FIG. 5, after the producing and curing process of the plurality of isolation walls 20 in the first preferred embodiment described above, since isolation wall 20 can completely isolate liquid crystal, thermo-curing glue that can have a chemical action on liquid crystal is chosen to be the material of sealant for replacing PMMA, and the material of this thermo-curing glue can be Epoxy Resin. In the process in which thermo-curing glue is used, a nozzle is also used to form a close sealant 30 according to set shape and location on outer edge of substrate 10 with thermo-curing glue. The sealant 30 must be located between outer edge of substrate 10 and cured isolation wall 20, wherein the distance between uncured sealant 30 formed by thermo-curing glue and cured isolation wall 20 is preferred to be kept as 5 mm. ODF process is then processed, wherein set quantity of liquid crystal is directly dropped in isolation wall 20 through a nozzle; the two substrates are then moved to a vacuum chamber to go through assembly and compressing process, wherein substrate 10 and 11 are aligned and adhered to each other with thermo-curing glue to form LCD panel 100. Finally, LCD panel 100 is moved to an oven for curing process of thermo-curing glue 30. In the present preferred embodiment, since there is no irradiating process of UV rays, there are advantages such as that the quality of liquid crystal and reliability of LCD panel 100 can be improved, and the cost of mask and UV Exposurer can also be saved.

In the process of coating thermo-curing glue 30, thermo-curing glue 30 can also be coated on substrate 11, but the relative location should be the same as the location on substrate 10 on which thermo-curing glue 30 is coated. Besides, isolation wall 20 can also be formed on substrate 11, and then LCD panel 100 is formed according to the steps described above.

According to what is said above, the deploying structure of isolation wall that is mutual-repulsive to liquid crystal and its producing method provided by the present invention can be used to isolate liquid crystal from sealant to prevent liquid crystal from being contaminated. And with this isolation wall structure and deployment of mask, liquid crystal can also be sheltered from UV rays so that UV rays will not have bad effects on liquid crystal. Besides, the present invention further provides a producing method using thermo-curing glue to form sealant, wherein thermal process is used for curing the sealant, which can increase the yield and also eliminate the effects on liquid crystal irradiated by UV rays, and thus greatly improve the reliability of producing process of LCD panel.

What are described above are only preferred embodiments of the present invention, not for confining the claims of the present invention; and for those who are familiar with the present technical field, the description above can be understood and put into practice, therefore any equal-effect variations or modifications made within the spirit disclosed by the present invention should be included in the appended claims.

As is understood by a person skilled in the art, the foregoing embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. Thus, while the preferred embodiment of the invention has been illustrated and described, it will be appreciated that various changes can be made therein without departing from the spirit and scope of the invention.

What is claimed is:

1. A producing method of liquid crystal panel with isolation wall structure, comprising:
    providing two substrates that have been put under alignment and cleaning process;
    coating a layer of photoresist on one of said two substrates;
    exposing and developing said photoresist to form a closing isolation wall structure on one of said two substrates;
    curing said closing isolation wall structure;
    coating a poly methyl methacrylate (PMMA) material on one of said two substrates, wherein said poly methyl methacrylate (PMMA) material being located between outer edge of said substrate and said closing isolation wall structure;
    processing One-Drop Filling process, wherein set quantity of liquid crystal being dropped directly inside said closing isolation wall structure;
    aligning and compressing to stick together said two substrates in a vacuum chamber, aligning said poly methyl methacrylate (PMMA) material on said two substrates and adhering them with each other to form a liquid crystal display panel; and
    curing said poly methyl methacrylate (PMMA) material.

2. The producing method of liquid crystal panel with isolation wall structure according to claim 1, wherein said closing isolation wall structure can be further formed by a plurality of closing isolation walls.

3. The producing method of liquid crystal panel with isolation wall structure according to claim 1, wherein the material of said closing isolation wall structure can be Epoxy Resin.

4. The producing method of liquid crystal panel with isolation wall structure according to claim 1, wherein the material of said poly methyl methacrylate (PMMA) material can be thermo-curing glue.

5. The producing method of liquid crystal panel with isolation wall structure according to claim 1, wherein said curing said poly methyl methacrylate (PMMA) material with UV rays irradiation.

6. The producing method of liquid crystal panel with isolation wall structure according to claim 1, wherein said poly methyl methacrylate (PMMA) material is roasted and cured with an oven.

7. A liquid crystal panel with a plurality of isolation walls, the structure of which comprising:
    two substrates, being put in an assembly in a distance, inner sides of said two substrates having been put under alignment process;
    a plurality of isolation walls, said isolation walls being closed and located between the inner sides of said two substrates;
    a poly methyl methacryklate (PMMA) material, being in closing shape, located between the inner sides of said two substrates and between outer edges of said two substrates and the outermost wall of said plurality of isolation walls; and
    a liquid crystal material, located between the innermost walls of said plurality of isolation walls, said liquid crystal and said plurality of isolation walls being mutual-repulsive.

8. The liquid crystal panel with a plurality of isolation walls according to claim 7, wherein the material of said plurality of isolation walls is PMMA.

9. The liquid crystal panel with a plurality of isolation walls according to claim 7, wherein the PMMA material of said plurality of isolation walls can be formed by Epoxy Resin.

10. The liquid crystal panel with a plurality of isolation walls according to claim 7, wherein the poly methyl methacrylate (PMMA) material can be made of Epoxy Resin.

11. The liquid crystal panel with a plurality of isolation walls according to claim 7, wherein the material of said poly methyl methacrylate (PMMA) material is thermo-curing glue.

12. A producing method of liquid crystal panel with a plurality of isolation walls, comprising:
- providing two substrates that have been put under aligning and cleaning process;
- coating a layer of photoresist on one of said two substrates; exposing and developing said photoresist to form a plurality of closing isolation walls on one of said two substrates;
- curing said closing isolation walls;
- coating a poly methyl methacrylate (PMMA) material on one of said two substrates, wherein said poly methyl methacrylate (PMMA) material being located between outer edge of said substrate and the outermost wall of said plurality of closing isolation walls;
- processing One-Drop Filling process, wherein set quantity of liquid crystal being dropped directly inside the inner wall of said plurality of closing isolation walls;
- aligning and compressing to stick together said two substrates in a vacuum chamber, aligning said poly methyl methacrylate (PMMA) material on said two substrates and adhering them with each other to form a liquid crystal display panel; and
- curing said poly methyl methacrylate (PMMA) material.

13. The producing method of liquid crystal panel with a plurality of isolation walls according to claim 12, wherein the material of said plurality of isolation walls can be Epoxy Resin.

14. The producing method of liquid crystal panel with a plurality of isolation walls according to claim 12, wherein the material of said poly methyl methacrylate (PMMA) material can be thermo-curing glue.

15. The producing method of liquid crystal panel with a plurality of isolation walls according to claim 12, wherein said curing said poly methyl methacrylate (PMMA) material with UV rays irradiation.

16. The producing method of liquid crystal panel with a plurality of isolation walls according to claim 14, wherein said poly methyl methacrylate (PMMA) material is roasted and cured with an oven.

* * * * *